United States Patent
Semineth et al.

(10) Patent No.: US 8,552,715 B2
(45) Date of Patent: Oct. 8, 2013

(54) METHOD AND DEVICE FOR DETERMINING THE ACTUATION POSITION OF AN ADJUSTING ELEMENT OF A MOTOR VEHICLE

(75) Inventors: Marco Semineth, Bad Koenigshofen (DE); Christian Thomann, Burgebrach (DE); Thomas Schindhelm, Neuhaus-Schierschnitz (DE)

(73) Assignees: Brose Fahrzeugteile GmbH & Co., Hallstadt (DE); Kommanditgesellschaft, Hallstadt (DE)

( * ) Notice: Subject to any disclaimer, the term of this patent is extended or adjusted under 35 U.S.C. 154(b) by 337 days.

(21) Appl. No.: 12/843,288

(22) Filed: Jul. 26, 2010

(65) Prior Publication Data
US 2011/0018528 A1    Jan. 27, 2011

(30) Foreign Application Priority Data

Jul. 24, 2009 (DE) .......................... 10 2009 034 664

(51) Int. Cl.
*G01B 7/30* (2006.01)
(52) U.S. Cl.
USPC .................................................... 324/207.25
(58) Field of Classification Search
USPC ................... 324/222, 223, 207.2, 207.25
See application file for complete search history.

(56) References Cited

U.S. PATENT DOCUMENTS

| 6,225,770 B1 | 5/2001 | Heinrich et al. | |
| 6,624,603 B2 * | 9/2003 | Preymann | 318/281 |
| 7,552,897 B2 * | 6/2009 | Gaston | 244/221 |

FOREIGN PATENT DOCUMENTS

| DE | 199 16 400 C1 | 5/2000 |
| DE | 101 54 498 A1 | 5/2003 |
| DE | 10 2006 043 839 A1 | 3/2008 |
| DE | 102006043839 | * 3/2008 |
| WO | WO 2009/036972 A2 | 3/2009 |

* cited by examiner

*Primary Examiner* — Arleen M Vazquez
*Assistant Examiner* — Feba Pothen
(74) *Attorney, Agent, or Firm* — Muncy, Geissler, Olds & Lowe, PLLC

(57) ABSTRACT

In order to determine the actuation position of a motor-driven adjusting element of a motor vehicle, a Hall-effect sensor is located in a rotatable magnetic field, wherein a periodic change in the magnetic flux density sensed by the Hall-effect sensor is converted into a binary pulse train in that a pulse transition takes place when an upper switching threshold is positively exceeded and when a lower switching threshold separated from the upper switching threshold by a hysteresis is negatively exceeded. The hysteresis is reduced following an inactive phase of the Hall-effect sensor during which the magnetic field was stationary and/or the Hall-effect sensor was deactivated, if the magnetic flux density at the start of the inactive phase has exceeded the upper switching threshold by no more than a predefined tolerance range.

14 Claims, 3 Drawing Sheets

METHOD AND DEVICE FOR DETERMINING THE ACTUATION POSITION OF AN ADJUSTING ELEMENT OF A MOTOR VEHICLE

This nonprovisional application claims priority under 35 U.S.C. §119(a) to German Patent Application No. DE 10 2009 034 664.3, which was filed in Germany on Jul. 24, 2009, and which is herein incorporated by reference.

BACKGROUND OF THE INVENTION

1. Field of the Invention

The invention relates to a method for determining an actuation position of a motor-driven adjusting element of a motor vehicle. It further relates to an actuator operating according to the method.

2. Description of the Background Art

In a modern motor vehicle, a number of actuators or adjusting elements operated by electric motors are usually present. These include, for example, an electric window regulator, an electric seat adjuster, and a device for motorized adjustment of a vehicle door, trunk lid, sunroof, or convertible top.

During an actuation process of such an adjusting element, it is frequently necessary to precisely move to a desired end position. A precise knowledge of the actuation position of the adjusting element is necessary for this purpose. The knowledge of the current actuation position or quantities that can be derived therefrom, such as the actuation speed or the travel that has been covered, are also frequently required for reliable detection of a pinch event or jamming.

For the most precise sensing of the actuation position of a window, it is known from, for example, DE 199 16 400 C1, which corresponds to U.S. Pat. No. 6,225,770, which is incorporated herein by reference, to provide a position and direction rotation sensor. This includes two Hall-effect sensors located offset from one another by a distance or angle, and a multipole, for example two-pole or four-pole, ring magnet located on the drive shaft of the electric motor. The Hall-effect sensors sense a magnetic field change resulting from a rotation of the ring magnet rigidly attached to the drive shaft and generate count pulses therefrom. These are analyzed in conjunction with information about the direction of rotation of the ring magnet, and hence of the electric motor, in that the count pulses are counted up or down depending on the direction of rotation of the drive, and thus indicate the current position of the window.

Integrated Hall-effect sensors are customarily employed for the sensor system, for example using CMOS (Complementary Metal Oxide Semiconductor) technology, which are integrated into a semiconductor chip (Hall IC) in addition to an analysis electronics unit, for example in ASIC (Application-Specific Integrated Circuit) technology together with the Hall-effect probes (DE 101 54 498 B4).

The Hall-effect probes can be understood as sensitive areas, for example as rectangular plates that are supplied with electrical energy in the form of a current or voltage source. In the presence of an external magnetic field perpendicular to this sensitive surface, a Hall voltage that is proportional to the magnetic flux density (induction) can be measured. A change in the magnetic flux density is also sensed by means of the Hall-effect sensor on the basis of the proportionality between the Hall voltage and the magnetic flux density. The Hall voltage change proportional thereto can then be analyzed accordingly as the sensor signal.

It is known from DE 10 2006 043 839 A1 to convert the magnetic field changes arising at the Hall-effect probes or Hall-effect sensors into two binary pulse trains, offset by 90° for example, in a comparator circuit with hysteresis (Schmitt trigger circuit). With such a comparator circuit with hysteresis, an upper switching threshold and a lower switching threshold are provided. By counting the pulses per unit of time, the rotational speed can be determined, while the direction of rotation of the electric motor or rotary drive is ascertained using a comparison of the two pulse trains.

As a result of the rotary motion of the ring magnet, its magnetic poles are alternately located directly opposite the end face of each sensitive Hall-effect area (Hall-effect probe), so that the magnetic field passing through this Hall-effect probe is oriented essentially orthogonal to the sensitive area. Accordingly, these orthogonal field components of the magnetic field and the Hall voltage proportional thereto are located in the vicinity of their maximum or minimum. In contrast, if the border between a north pole and a south pole of the ring magnet is located directly opposite the end face of this sensitive area, then the magnetic field passing through it is essentially parallel to the plane of the area, with the result that the Hall voltage becomes zero. As a function of the distance between the ring magnet and the Hall-effect areas of the Hall-effect sensor or Hall IC, the result is thus an at least approximately sinusoidal behavior of both the corresponding field component and the Hall voltage as a function of the angle of rotation.

When the relevant field component of the flux density (Hall voltage), which is sinusoidal as a function of the angle of rotation, exceeds the upper switching threshold, the pulse within the pulse train changes from a first logic level to a second logic level. This condition remains in effect until the relevant field component of the flux density, or the Hall voltage, negatively exceeds (falls below) the lower switching threshold.

Thus, the pulse train maintains the high level (logic 1), for example, both below the lower threshold and within the hysteresis between the two switching thresholds, until the upper switching threshold is exceeded again. Accordingly, the low level (logic 0) is maintained within the hysteresis until the lower threshold is negatively exceeded again. The upper switching threshold and the lower switching threshold are arranged symmetrically about the center line of the hysteresis, representing the zero crossing of the approximately sinusoidal curve of the magnetic flux density or the Hall voltage. The state definition under which a low level is prescribed above the upper switching threshold and a high level is always prescribed below that point is customary for a CMOS Hall-effect sensor.

In contrast, for an ideal sensor the region between a zero or center line within the hysteresis and the upper switching threshold is predefined as a low level, for example, while the region below the center line of the hysteresis to the lower switching threshold is predefined as a high level. Thus, in such an ideal sensor, the region above the upper switching threshold is assigned the low level, and the region below the lower switching threshold is assigned the high level.

Independently of the sensor concept, but in particular when a CMOS Hall-effect sensor is used in which a level change takes place when the upper threshold is positively exceeded and when the lower threshold is negatively exceeded, and a specific level, for example a high level, is prescribed within the hysteresis, states can arise that can lead to miscounting. Conditions leading to miscounting resulting from shifting of the switching thresholds of the Hall-effect sensor due to its self-heating or cooling, or a (slight) reverse rotation of the ring magnet subsequent to execution of a stop function of the electric motor, are extremely difficult to handle in this context. The danger of immediate miscounting of the Hall-effect sensor exists, in particular, after shutoff of the Hall-effect sensor or after restarting of a drive unit having the electric motor and ring magnet from an inactive phase (quiescent phase) when the switching thresholds have shifted as a result of temperature or operating conditions, and one pulse too many or too few is counted as a result.

To avoid miscounting, it is known from WO 2009/036972A2, which is incorporated herein by reference, to encode the switching states triggered by the changes in flux density or Hall voltage within the rotational-direction-dependent pulse train of the sensor output signal of the Hall-effect sensor by means of different pulse widths of the individual pulses.

SUMMARY OF THE INVENTION

It is therefore an object of the present invention to provide an especially simple and suitable method for determining a position of a motor-driven adjusting element of a motor vehicle using a Hall-effect sensor. A further object is to provide a device that is especially suitable for carrying out the method.

To this end, subsequent to an inactive phase (quiescent or shutdown phase), the hysteresis between an upper switching threshold and a lower switching threshold is reduced if the magnetic flux density (or the Hall voltage) has exceeded the upper switching threshold by a specific amount at the start of, or shortly before, the inactive phase. This amount can be a predefined tolerance range by which the upper switching threshold has been exceeded. The tolerance range here can be smaller than the separation between the upper switching threshold and the maximum of the magnetic flux density or of the voltage curve. In this process, the amount of reduction of the hysteresis is derived in a suitable manner from a temperature-dependent and/or system-dependent threshold shift of the upper and/or lower switching threshold.

Depending on the sensor concept, the hysteresis can also be reduced in an analogous fashion following an inactive phase of the Hall-effect sensor during which the magnetic field was stationary or the Hall-effect sensor was deactivated, in the event that the magnetic flux density negatively exceeded the lower switching threshold at the beginning of the inactive phase, preferably likewise by no more than the predefined tolerance range.

In this regard, the invention is based on the concept that, while it is true that states in which the magnetic flux density (Hall voltage) lies within the hysteresis both at the beginning of and after an inactive phase can be compensated in a manner dependent on the direction of rotation by adding or subtracting a pulse, such a compensation via a suitable algorithm is not possible for erroneous positive or negative threshold exceedances resulting from threshold drift, in particular of the upper switching threshold.

Thus, when the Hall-effect sensor is activated following an inactive phase, it should not provide a constant or statistically arbitrary preferred value at its signal output, but rather should select the state or level that corresponds to the switching threshold that is currently closer. This can in turn be achieved in a suitable manner by the means that, following an inactive phase and at the beginning of the subsequent active phase during which the Hall-effect sensor is activated or a new magnetic field change occurs, the switching threshold or every switching threshold is briefly reduced in an appropriate manner.

In this way, which is to say by briefly reducing the hysteresis, states above the upper switching threshold at the beginning of an inactive phase are then also recognized as such states subsequent to an inactive phase, and thus at the beginning of a new active phase, if as a result of a threshold drift the corresponding state would have been located within the hysteresis in the absence of a reduction of the hysteresis. The degree of reduction of the switching thresholds, and thus the degree of reduction of the hysteresis, should in this case at least slightly exceed a threshold shift resulting from self-heating of the Hall-effect sensor as well as a field strength or flux density change in the magnetic field resulting from the temperature variation of the ring magnet. The degree of reduction or decrease in the switching thresholds can also be derived from the specific minimum switching threshold of the Hall-effect sensor and thus be below this minimum threshold to the degree possible.

By means of this measure of increased sensitivity to positive and negative exceedance of the switching thresholds by the magnetic flux density (Hall voltage), field strengths or flux densities that are slightly above the zero or center line, but still lie within the hysteresis, lead to a specific initial state (e.g., low level). In contrast, field strengths or flux densities that are slightly below the center line, but which in turn still lie within the hysteresis, lead to the opposite initial state (high level) at the signal output of the Hall-effect sensor.

Subsequent to such a selective determination of the initial state at the beginning of an active phase and following an inactive phase during which the magnetic field was stationary and/or the Hall-effect sensor was deactivated, a resetting of the switching thresholds to their nominal value can take place.

The periodic change in the magnetic flux density sensed by the Hall-effect sensor or the Hall voltage is converted into a binary pulse train. In a Hall-effect sensor implemented as a CMOS sensor (Hall IC), in which a comparator circuit is integrated in the form of a Schmitt trigger for example, this pulse train is already available as a binary pulse train at a Hall-effect sensor or signal output. In addition to this first binary pulse train of a first sensor output signal, a similarly produced but phase-shifted second sensor output signal is preferably generated, so that two mutually time-shifted binary pulse trains are available at the Hall-effect sensor. In this context, one of the two binary pulse trains is used for speed determination (speed signal) by counting the pulses per unit time and/or per angle unit, while the other binary pulse train or its phase comparison with the pulse train that is time-shifted with respect thereto is used for unambiguous determination of direction of rotation (direction signal). The direction of rotation in turn determines whether the current pulses of the speed signal are counted up or down in a counter. By this means, the particular position of, for example, a window, along its travel path can be reliably determined independently of whether it is driven in the closing direction or in the opening direction.

According to a further embodiment of the method, after an inactive phase of the Hall-effect sensor, an additional pulse of the pulse train is discarded in the event that, at the start of the inactive phase, the magnetic flux density has a value within the hysteresis and the subsequent active phase of the Hall-effect sensor begins in the direction opposite to the direction of rotation of the magnetic field as compared to the inactive phase. Such a compensation of a counting error is advantageous in particular when the magnetic flux density (Hall voltage) at the beginning of the inactive phase is in the vicinity of the center of the hysteresis, for example is slightly above or slightly below the center of the hysteresis.

In analogous fashion, subsequent to an inactive phase of the Hall-effect sensor, a pulse of the pulse train is counted twice if, at the start of the inactive phase, the magnetic flux density has a value within the hysteresis and the subsequent active phase of the Hall-effect sensor begins in the same direction as the direction of rotation (same direction) of the magnetic field before the inactive phase. This type of compensation is always especially useful when the magnetic flux density (Hall voltage), and thus the state of the Hall-effect sensor, is located as far away as possible from the upper switching threshold within the hysteresis—or is even below the lower switching threshold—at the beginning of the inactive phase.

The advantages achieved with the invention include that improved resistance to undesirable counting errors is achieved through the specifically controlled reduction of the hysteresis or hysteresis range of an appropriate Hall-effect sensor for determining the actuation position of a motor-driven adjusting element of a motor vehicle. The amount of the short-term reduction of the hysteresis range at the start of an active phase, and in particular subsequent to an inactive phase, of the Hall-effect sensor is advantageously brought about by a targeted shift of, e.g., the sensor-internal switching thresholds toward the center of the hysteresis by an amount that corresponds at least to the magnitude of a threshold drift resulting from a heating or cooling of the Hall-effect sensor. In addition or alternatively, the amount of shift in the switching thresholds, and hence of the short-term decrease (reduction) of the hysteresis range, can also be oriented toward the size of a system-related change in the flux density (Hall voltage) resulting from a reverse rotation of the drive (electric motor) as it is stopped (shut off).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Corresponding parts are labeled with the same reference symbols in all figures.

Figure 1:
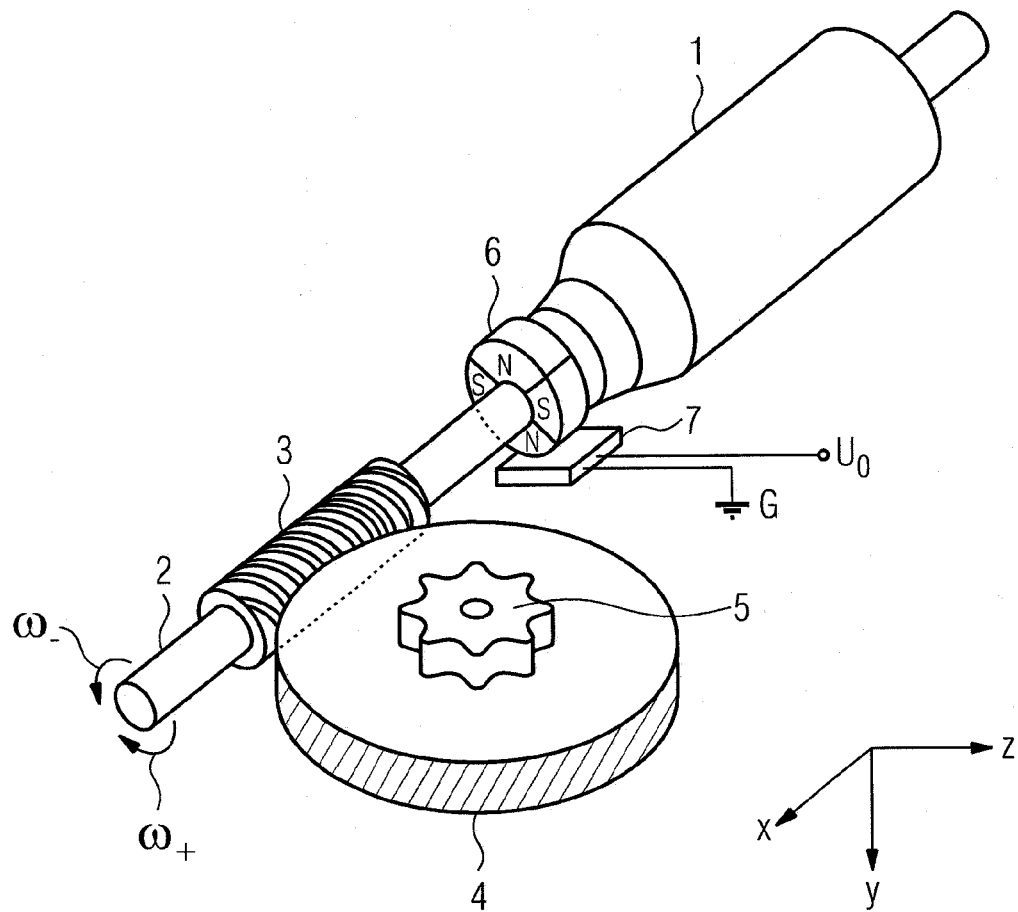
FIG. 1 schematically shows a perspective view of an electric motor drive with a ring magnet on the drive side and with a Hall-effect sensor with following analysis unit.

FIG. 1 shows an electric motor drive 1, for example a power window drive, of a motor vehicle with a drive shaft 2 bearing the rotor or armature (not shown) of an electric motor and with a worm drive that has a worm 3 located on the drive shaft 2 and a helical-cut worm gear 4 that meshes therewith. Due to the gear ratio between the worm 3 and the worm gear 4, the latter's rotational speed is reduced relative to the rotational speed ω of the drive shaft 2, while the torque is increased. While the drive shaft 2 rotates about the x axis shown, the worm gear 4, which lies in a plane parallel to the xz plane, rotates about an axis of rotation y that is perpendicular thereto.

The worm drive 3, 4 is mechanically coupled by means of a gear attachment 5 in a manner not shown in detail, for example a cable drum and a sheathed cable, to a carrier—often guided by rails—of a window as an adjusting element in the motor vehicle. By this means the adjusting element can be moved automatically along a travel path, in particular between an open and a closed position.

On the drive shaft 2 sits a ring magnet 6 rotating therewith, which in the example embodiment has two each of north poles N and south poles S. A Hall-effect sensor 7 is located a distance away from the ring magnet 6.

Figure 2:
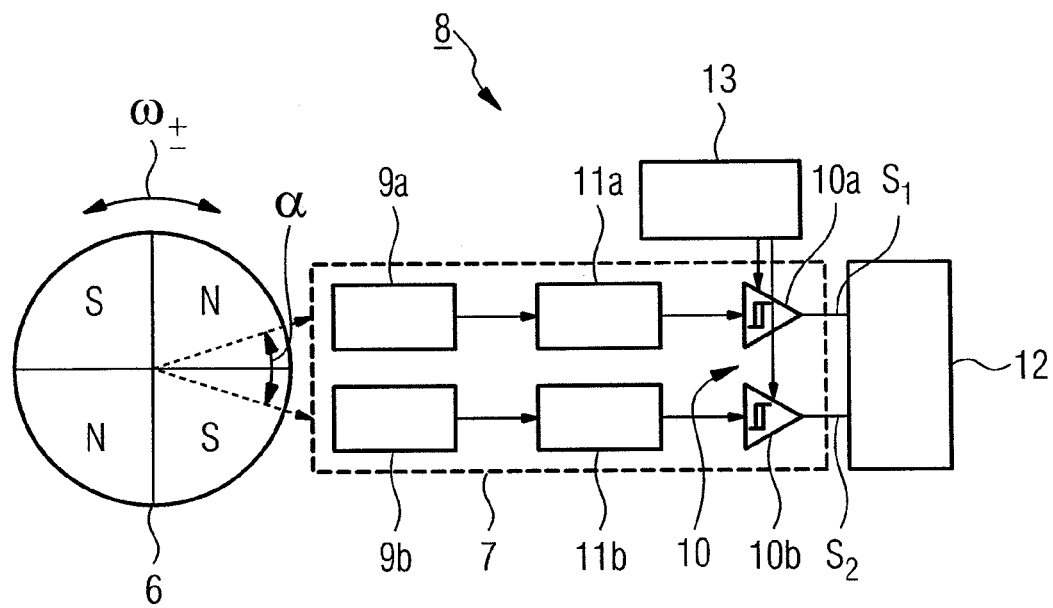
FIG. 2 shows a block diagram of an inventive device for determining the actuation position of an adjusting element operated by means of the drive from FIG. 1.

FIG. 2 schematically shows the arrangement of a device 8 for determining the actuation position of the relevant adjusting element with the rotating ring magnet 6 and the Hall-effect sensor 7 spaced apart therefrom. The Hall-effect sensor 7 comprises two magnetic-field-sensitive areas $9a$, $9b$, hereinafter called Hall-effect probes, which are integrated into a Hall IC, for example, with a comparator circuit 10 having hysteresis. The Hall-effect sensor 7 or the Hall IC is supplied with the supply voltage $U_0$ and has a ground G. Amplifier and/or filter components $11a$, $11b$ can be integrated into or associated with the Hall-effect sensor 7 between the Hall-effect probes $9a$, $9b$ and the comparators or Schmitt triggers $10a$, $10b$ of the comparator circuit 10.

The Hall-effect sensor 7 is connected at its output side to an analysis unit or circuit 12 to which the output signals $S_1$ and $S_2$ of the comparator circuit 10 are routed. The output signal $S_1$ here represents, e.g., the rotational speed, while the output signal $S_2$ represents the direction of rotation of the ring magnet 6 and thus of the drive shaft 2 of the electric motor drive 1. A control unit 13 connected to the comparators or Schmitt triggers $10a$, $10b$ of the comparator circuit 10 is suitable for, and is configured for, changing the hysteresis of the comparator circuit 10.

As a result of the magnetic field of the ring magnet 6, in each of the first and second Hall-effect probes $9a$ and $9b$ through which the magnetic field passes there is generated a Hall voltage $U_H$ that is proportional to the magnetic flux density B passing through each of the respective Hall-effect probes $9a$ and $9b$. The time-dependent behavior of the Hall voltage $U_H$ of the Hall-effect probes $9a$ and $9b$ is shown in the respective top diagram sections of FIGS. 3 and 4. The digital sensor output signals $S_1$ available at the output side of the Hall-effect sensor 7 are shown in the diagrams thereunder in FIGS. 3 and 4.

As a result of the rotation of the ring magnet 6, the stationary Hall-effect sensor 7 is located in a rotating magnetic field, wherein the Hall-effect probes $9a$ and $9b$ are each located opposite north poles N and south poles in alternation (FIG. 2). The resultant changes in the magnetic flux density B passing through the respective Hall-effect probes $9a$ and $9b$ leads to a corresponding change in the Hall voltage $U_H$ of the Hall-effect sensor 7 that is proportional thereto in each case and undergoes polarity reversal synchronous with the rotation of the ring magnet 6.

Figure 3:
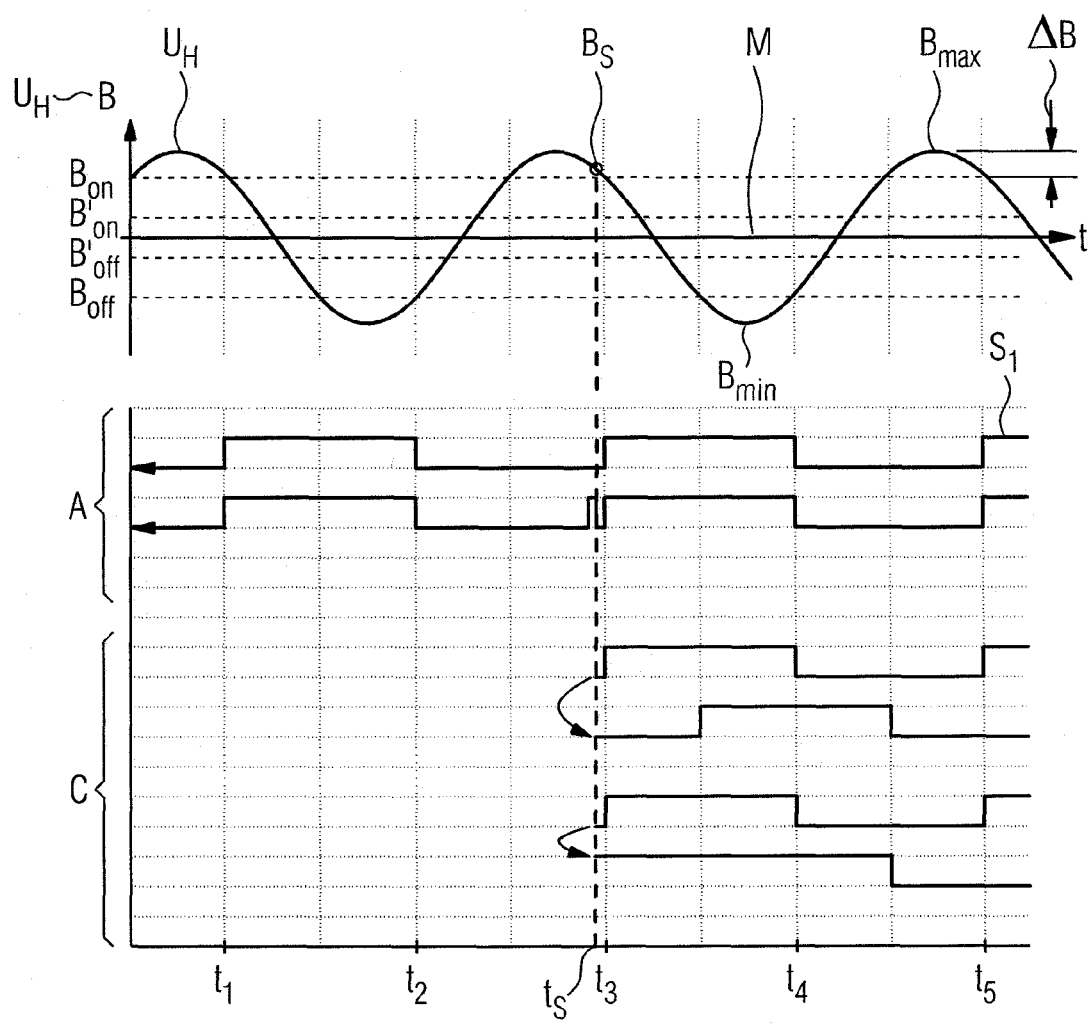
FIG. 3 shows a diagrammatic representation of the curve of sensor-side flux density or voltage signals with pulse trains of a sensor output signal for nominal and reduced hysteresis in the same and opposite directions of the drive.
Figure 4:
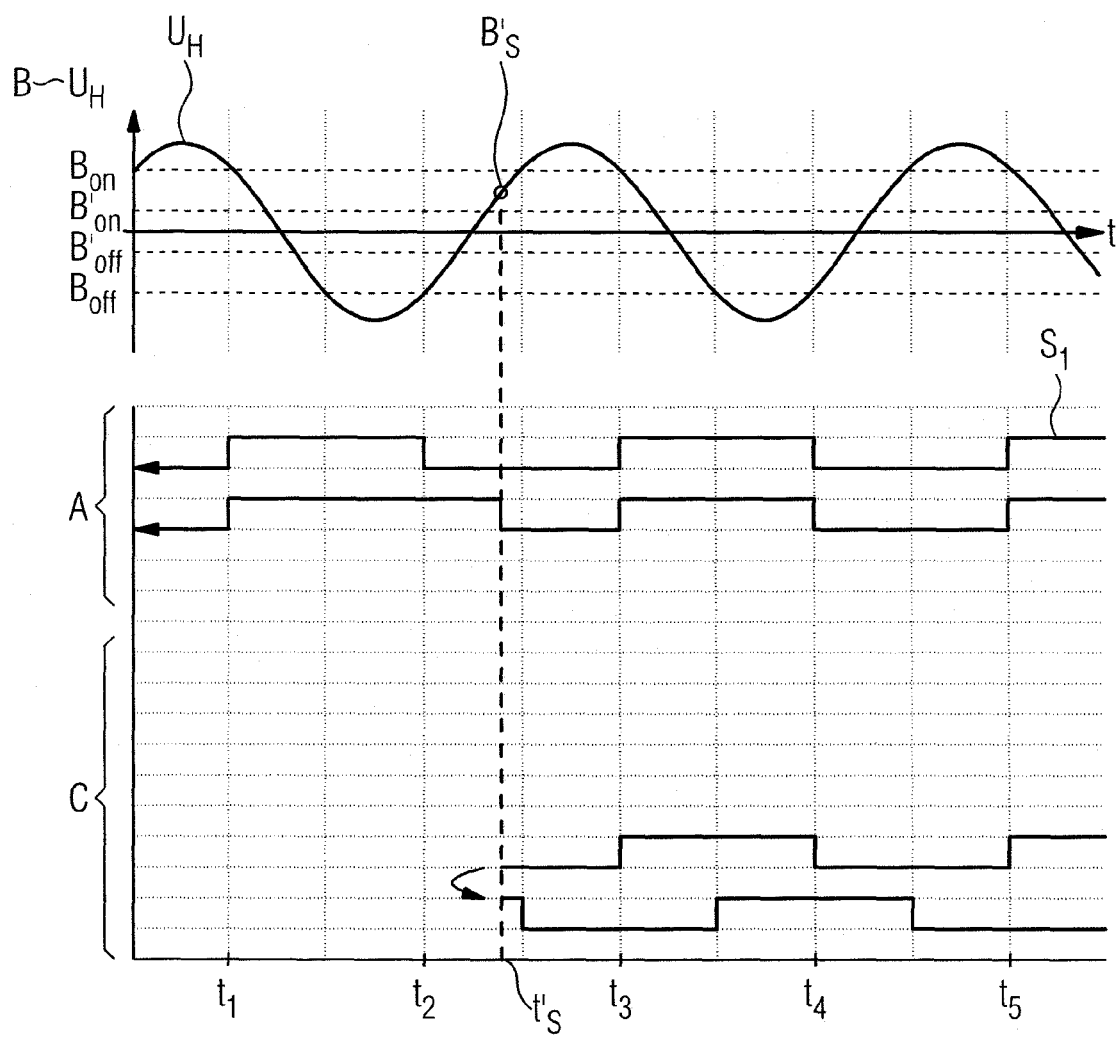
FIG. 4 shows a diagrammatic representation as in FIG. 3 of a counting-error-compensated pulse train of the sensor output signal and pulse trains with counting errors in the same and opposite directions of the drive.

In accordance with the top diagrams in FIGS. 3 and 4, in which the sinusoidal behavior over time of the flux density B or the Hall voltage $U_H$ proportional thereto is shown, the flux density B (Hall voltage $U_H$) oscillates about the center value B=0 ($U_H$=0), which represents the center line M of the hysteresis, with half the period of rotation T of the ring magnet 6. Here, T is the time required for the ring magnet 6 to make a 360° rotation. At an integer multiple of a period T/2, which for the four-pole ring magnet 6 in the example corresponds to half the period of rotation T, within which time one north pole N and one south pole of the ring magnet 6 passes by the Hall-effect probes 9a and 9b, the magnetic flux density B (Hall voltage $U_H$) averaged over time is zero. It is evident that the maxima $B_{max}$ of the magnetic flux density B lie above the upper switching threshold $B_{on}$ by a tolerance range ΔB, while the minima $B_{min}$ of the magnetic flux density B lie below the lower switching threshold $B_{off}$ by, e.g., the same tolerance band ΔB. Here, α is the angular spacing between the Hall-effect probes 9a and 9b with respect to the ring magnet 6.

The time dependencies of the Hall voltages $U_H$ of the two Hall-effect probes 9a and 9b are practically identical. Nonetheless, in a manner not shown in detail, either the Hall voltage $U_H$ of the Hall-effect probe 9a or the Hall voltage $U_H$ of the Hall-effect probe 9b leads, or in the opposite direction of rotation lags, by the phase φ=α/ω as a function of the direction of rotation $ω_+$, $ω_-$.

As illustrated by way of example in FIG. 3 using the magnetic flux density B (Hall voltage $U_H$) of the Hall-effect probe 9a, over the time t the flux density B (Hall voltage $U_H$) positively exceeds an upper switching threshold $B_{on}$ and negatively exceeds a lower switching threshold $B_{off}$. The switching thresholds $B_{on}$, $B_{off}$ are the thresholds of the comparators or Schmitt triggers 10a, 10b and thus of the Hall-effect sensor 7.

The bottom diagram in FIG. 3 shows that the comparator circuit 10 generates a digital output signal $S_1$ with a binary pulse train whose pulse count per unit time represents the rotational speed. Viewing the signal behavior of the digital output signal $S_1$ from right to left, a signal or level change from logic "1" to logic "0" is evident at time $t_5$ as soon as the magnetic flux density B (Hall voltage $U_H$) positively exceeds the upper switching threshold $B_{on}$. This low level (0) remains effective over the time t until the magnetic flux density B (Hall voltage $U_H$) negatively exceeds the lower switching threshold $B_{off}$. At this time $t_4$, a level change again takes place from the low level (0) to the high level (1).

Within the hysteresis that designates the range between the two switching thresholds $B_{on}$, $B_{off}$ no level change occurs when the upper switching threshold $B_{on}$ is positively exceeded and when the lower switching threshold $B_{off}$ is negatively exceeded. Let the predefined preferred value within the hysteresis be logic "1" here, which is to say the high level. If a rotation of the drive shaft 2, and thus a rotary motion of the ring magnet 6, is stopped at a point in time $t_s$ and/or the supply voltage $U_0$ of the Hall-effect sensor 7 is switched off, and hence the Hall-effect sensor 7 is deactivated at this point in time $t_s$, then the start of an inactive phase is determined at this point in time $t_s$. The value $B_s$ of the current magnetic flux density at this point in time $t_s$ is, for example, slightly greater than the value of the upper switching threshold $B_{on}$. Because of fluctuations, the value of the current magnetic flux density B after the inactive phase upon renewed rotary motion of the ring magnet 6 or activation of the Hall-effect sensor 7 can be below the upper switching threshold $B_{on}$, and thus within the hysteresis. Such fluctuations can arise as a result of self-heating or cooling of the Hall-effect sensor 7 as a function of temperature and/or can arise as a result of a slight reverse rotation of the electric motor, and thus of the drive 1 and the ring magnet 6, which frequently is almost unavoidable in practice.

As a result, at the start of the next active phase in which a rotary motion of the ring magnet 6 again takes place and the supply voltage $U_0$ of the Hall-effect sensor 7 is switched on, the current magnetic flux density B would again positively exceed the upper switching threshold $B_{on}$, which would result in an erroneous level change, and thus in a miscounting of the pulses of the binary pulse train of the output signal $S_1$.

Such a counting error is illustrated in FIG. 3 in the portion of the diagram labeled A for the transition from an inactive phase to an active phase in the same direction of rotation (same direction). It is evident that an additional high level is generated between the point in time $t_3$ and the point in time $t_2$, during which a low level would have to be present in the binary pulse train of the output signal $S_1$ in error-free operation. As a result, one high-level pulse too many would be counted in the time interval between $t_4$ and $t_3$.

The diagram portion labeled C in FIG. 3 illustrates the situation in the opposite direction, when the direction of rotation of the ring magnet 6 at the beginning of the active phase is opposite to its direction of rotation at the beginning of the preceding inactive phase (opposite direction). In this context, the upper pulse train in the diagram section C (opposite direction) shows the situation when the supply voltage $U_0$ of the Hall-effect sensor 7 is not switched off, while the pulse train below it illustrates the situation when the supply voltage $U_0$ of the Hall-effect sensor 7 is switched off. Here, the current pulse of the pulse train of the output signal $S_1$ is erroneously at the high level (1) after the supply voltage $U_0$ of the Hall-effect sensor 7 has been switched back on.

In order to avoid such counting errors, the hysteresis is reduced subsequent to the inactive phase of the Hall-effect sensor 7 when, at the start of the inactive phase, the magnetic flux density B has positively exceeded the upper switching threshold $B_{on}$ by at most the predefined tolerance range ΔB. To this end, at least the upper switching threshold $B_{on}$ is reduced to a value $B'_{on}$. In addition, the value of the lower switching threshold $B_{off}$ can be increased to a value $B'_{off}$. In other words, the reduction of the hysteresis is accomplished by an at least short-term shift of preferably both switching thresholds $B_{on}$ and $B_{off}$ toward the center line M of the hysteresis. The shift is accomplished by a change or switchover of the switching thresholds from $B_{on}$ to $B'_{on}$ or from $B_{off}$ to $B'_{off}$ controlled by means of the control device 13.

FIG. 4 illustrates, in a diagram similar to FIG. 3, an additional compensation algorithm for correcting counting errors when the magnetic flux density B (Hall voltage $U_H$) has a value $B'_s$ within the hysteresis at the start of the inactive phase. If, following the inactive phase, the subsequent active phase of the Hall-effect sensor 7 begins in the same direction of rotation (same direction A), the pulse that is missed in the absence of the compensation algorithm is compensated by double-counting the preceding pulse. The pulse is missed because, on account of the predefined preferred value within the hysteresis range, the current value $B'_s$ lying within the hysteresis is assigned a high level (1) when the supply voltage $U_0$ of the Hall-effect sensor 7 is switched back on and the low level (0) is not continued. In an analogous manner, in the opposite direction C an erroneously overcounted pulse of the pulse train is ignored.

The reduction in hysteresis by lowering at least the upper switching threshold $B_{on}$ always takes place when the value $B_s$ of the magnetic flux density lies within the tolerance region ΔB at the beginning of an inactive phase, and thus has at least slightly exceeded the upper switching threshold $B_{on}$. The tolerance region ΔB, and in particular the separation of the upper switching threshold $B_{on}$ from the maximum $B_{max}$ of the magnetic flux density, can also be greater than the typical or maximum possible temperature-related or system-related shifts of the switching threshold $B_{on}$ (threshold drift) here.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining an actuation position of a motor-driven adjusting element of a motor vehicle via a Hall-effect sensor arranged in a rotatable magnetic field, the method comprising:
    converting a periodic change in a magnetic flux density sensed by the Hall-effect sensor into a binary pulse train, a pulse being transitioned when an upper switching threshold is positively exceeded and when a lower switching threshold separated from the upper switching threshold by a hysteresis is negatively exceeded; and
    reducing the hysteresis following an inactive phase of the Hall-effect sensor, during which phase, the magnetic field is stationary and/or the Hall-effect sensor is deactivated if the magnetic flux density at the start of the inactive phase has exceeded the upper switching threshold by no more than a predefined tolerance range,
    wherein the hysteresis is reduced by lowering the upper switching threshold, and
    wherein the hysteresis is reduced by an amount that corresponds at least to a magnitude of a threshold drift resulting from a heating or cooling of the Hall-effect sensor.

2. The method according to claim 1, wherein a tolerance range is smaller than the difference between the upper switching threshold and a maximum value of the magnetic flux density.

3. The method according to claim 1, wherein the periodic change in the magnetic flux density is sensed by a first Hall-effect probe of the Hall-effect sensor, which generates a binary pulse train as a first output signal.

4. The method according to claim 1, wherein the periodic change in the magnetic flux density is sensed by a second Hall-effect probe of the Hall-effect sensor that is offset from the first Hall-effect probe by an angle, and wherein a second output signal is generated for determining a direction of rotation that is phase-shifted from the first output signal.

5. The method according to claim 1, wherein, after an inactive phase of the Hall-effect sensor, an additional pulse of the pulse train is discarded in the event that, at the start of the inactive phase, the magnetic flux density has a value within the hysteresis and the subsequent active phase of the Hall-effect sensor begins in a direction opposite to a direction of rotation of the magnetic field with respect to the inactive phase.

6. The method according to claim 1 wherein, after the inactive phase of the Hall-effect sensor, a pulse of the pulse train is counted twice in the event that, at the start of the inactive phase, the magnetic flux density has a value within the hysteresis and the subsequent active phase of the Hall-effect sensor begins in the same direction of rotation of the magnetic field as before the inactive phase.

7. A device for determining an actuation position of a motor-driven adjusting element of a motor vehicle, the device comprising:
    a rotatable ring magnet;
    a Hall-effect sensor spaced apart from the rotatable ring magnet, the Hall-effect sensor configured to detect time-dependent and/or angle-dependent changes in a magnetic flux density resulting from a rotational motion of the ring magnet, the time-dependent and/or angle-dependent changes being converted into a binary pulse train;
    a comparator circuit having a hysteresis between an upper switching threshold and a lower switching threshold; and
    a control device configured to shift the upper and lower switching thresholds toward a center line of the hysteresis,
    wherein the upper and lower switching thresholds are shifted by an amount that corresponds at least to a magnitude of a threshold drift resulting from a heating or cooling of the Hall-effect sensor.

8. The device according to claim 7, wherein the Hall-effect sensor has a first Hall-effect probe and a second Hall-effect probe, which are connectable at their outputs to a comparator circuit.

9. The device according to claim 7, wherein a first output signal representing the speed of rotation of an electric motor drive is available at an output of the comparator circuit.

10. The device according to claim 7, wherein an output signal representing the direction of rotation of the electric motor drive is available at an output of the comparator circuit.

11. The method according to claim 1, wherein the amount of reduction is derived from a specific minimum switching threshold of the Hall-effect sensor.

12. The device according to claim 7, wherein the control device is configured to shift the upper and lower switching thresholds toward a center line of the hysteresis following an inactive phase of the Hall-effect sensor, during which phase, the magnetic field is stationary and/or the Hall-effect sensor is deactivated if the magnetic flux density at the start of the inactive phase has exceeded the upper switching threshold by no more than a predefined tolerance range.

13. A device, comprising:
    a motor-driven adjusting element of a motor vehicle;
    a rotatable ring magnet;
    a Hall-effect sensor spaced apart from the rotatable ring magnet, the Hall-effect sensor configured to sense a magnetic flux density; and
    a control device configured to:
        convert a periodic change in the magnetic flux density sensed by the Hall-effect sensor into a binary pulse train, a pulse being transitioned when an upper switching threshold is positively exceeded and when a lower switching threshold separated from the upper switching threshold by a hysteresis is negatively exceeded; and
        reduce the hysteresis following an inactive phase of the Hall-effect sensor, during which phase, the magnetic field is stationary and/or the Hall-effect sensor is deactivated if the magnetic flux density at the start of the inactive phase has exceeded the upper switching threshold by no more than a predefined tolerance range,
    wherein the hysteresis is reduced by lowering the upper switching threshold, and
    wherein the hysteresis is reduced by an amount that corresponds at least to a magnitude of a threshold drift resulting from a heating or cooling of the Hall-effect sensor.

14. The method according to claim 1, wherein an amount the hysteresis is reduced is oriented toward a size of a system-related change in flux density resulting from a reverse rotation of the motor-driven adjusting element.

* * * * *

UNITED STATES PATENT AND TRADEMARK OFFICE
CERTIFICATE OF CORRECTION

PATENT NO. : 8,552,715 B2  
APPLICATION NO. : 12/843288  
DATED : October 8, 2013  
INVENTOR(S) : Semineth et al.

Page 1 of 1

It is certified that error appears in the above-identified patent and that said Letters Patent is hereby corrected as shown below:

On the title page item [73] should read

[73] Assignees: Brose Fahrzeugteile GmbH & Co. Kommanditgesellschaft, Hallstadt, Hallstadt (DE)

Signed and Sealed this  
Nineteenth Day of November, 2013

Teresa Stanek Rea  
*Deputy Director of the United States Patent and Trademark Office*